H. B. FOLSETTER.
AXLE LUBRICATOR.
APPLICATION FILED MAR. 5, 1920.

1,373,126.

Patented Mar. 29, 1921.

Inventor
H. B. Folsetter.

By Fred G. Dieterich
Attorneys

UNITED STATES PATENT OFFICE.

HONEYMAN B. FOLSETTER, OF VANCOUVER, BRITISH COLUMBIA, CANADA.

AXLE-LUBRICATOR.

1,373,126.  Specification of Letters Patent.  Patented Mar. 29, 1921.

Application filed March 5, 1920. Serial No. 363,377.

*To all whom it may concern:*

Be it known that I, HONEYMAN B. FOLSETTER, a citizen of the Dominion of Canada, residing at Vancouver, in the Province of British Columbia, Canada, have invented certain new and useful Improvements in Axle-Lubricators, of which the following is a specification.

This invention relates to a means for applying a hard grease as a lubricant to the axle bearing of a railway vehicle. Usually these bearings are lubricated by means of oil-soaked waste packed within the axle box in contact with the supporting end of the axle.

It is to apply lubrication by means of hard grease instead of oil in an existing axle box, that the invention which is the subject of this application has been devised.

Figure 1:
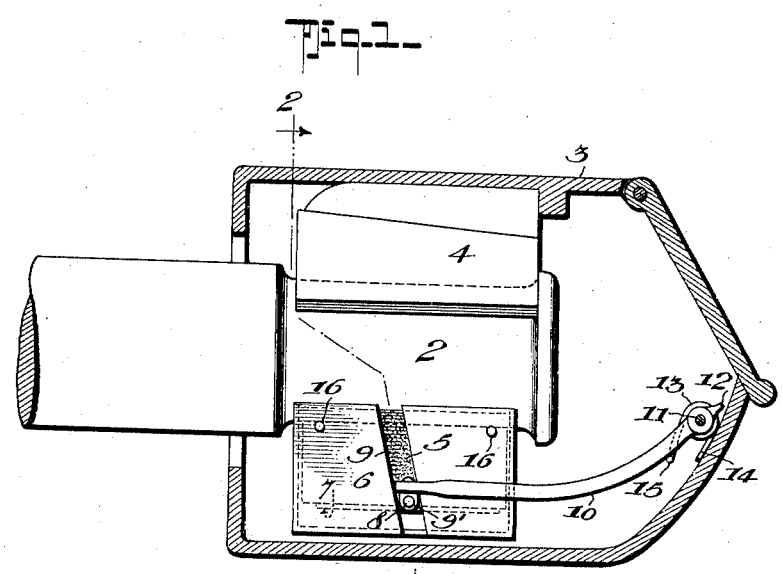
Figure 2:
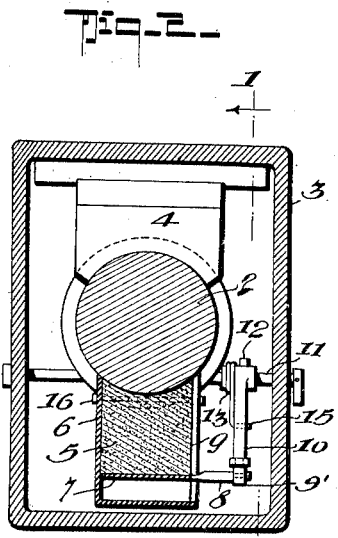

The invention is particularly described in the following specification, reference being made to the drawings by which it is accompanied, in which:

Figure 1 is a section through the axle box on the line 1—1 in Fig. 2 showing the grease lubricating device in elevation, and Fig. 2 is a vertical cross section on the line 2—2 in Fig. 1.

In these drawings 2 represents the axle end of a railway vehicle and 3 the axle box within which is the bearing 4, which sustains the load on the axle. To the underside of the axle 2 is applied a block 5 of hard grease which is retained in position by a sheet metal casing 6 conforming generally to the dimension of the grease block and the upper edge of it fitting against the curvature of the axle end 2.

The length of this block of grease and its casing 6 is somewhat less than the length of the axle end 2 between its shoulders, so as to permit of the desired limited endwise movement of the axle.

The block of grease 5 is held up against the underside of the axle by a presser plate 7 on which it rests, which plate is provided on one side with a stem 8 which projects through a slotted aperture 9 in one side of the casing, and is mounted in a bearing 9', pivotally mounted to turn on a vertical axis in the end of an arm 10 mounted free on a pin 11, which extends across the front of the axle box 4 and is supported in its side walls. The arm 10 has a projection 12 adjacent the pin 11 by which the movement of the grease supporting end of the arm is limited toward the axle, and around the rod a spring 13 is coiled, the ends of which bear at 14 on the axle box and at 15 on the arm 10.

The block of grease 5 is thus held by the presser plate 7, arm 10 and spring 13 in lubricating contact with the underside of the axle ends 2 in a manner that it may adapt itself to the movement of the axle in the axle box, and is retained against lateral displacement by the casing 6 to which the grease block 5 is connected by pins 16 which pass through the sides of the casing and through the grease.

Having now particularly described my invention, I hereby declare that what I claim as new and desire to be protected in by Letters Patent, is:

1. Means for lubricating a railway axle with hard grease, said means comprising the combination with the axle box and its bearing on the axle, of a block of hard grease, a container for the block of grease, means securing the container to the block of grease and a resilient means for holding the block of grease and the container with the grease in contact with the axle.

2. Means for lubricating a railway axle with hard grease, said means comprising the combination with the axle box and its bearing on the axle, a block of hard grease applied to the underside of the axle, a substantially rectangular frame of thin metal inclosing the sides and ends of the grease block, means for connecting the grease to the casing, a presser plate freely fitting the casing and applied to the underside of the grease, and means for applying a resilient upward pressure to the plate.

3. Means for lubricating a railway axle with hard grease, said means comprising a substantially rectangular frame extending approximately the length of the axle bearing and adapted to receive a correspondingly shaped block of hard grease with provision for retaining the grease in the frame, a presser plate freely fitting the frame, said plate having a pin projecting horizontally from one side adjacent its midlength, a lever mounted on a pin extending horizontally across the front of the axle box, a spring between the axle box and the lever tending to move the lever upward, and means connecting the free end of the lever to the pin of the presser plate and allowing horizontal and vertical movement in such connection.

In testimony whereof I affix my signature.

HONEYMAN B. FOLSETTER.